(12) United States Patent
Hasan et al.

(10) Patent No.: US 11,660,173 B2
(45) Date of Patent: May 30, 2023

(54) DENTURE BASE AND DENTAL PROSTHESIS

(71) Applicant: DENTSPLY SIRONA Inc., York, PA (US)

(72) Inventors: Md Abu Hasan, York, PA (US); Mark Eberhardt, Elverson, PA (US); Jay F Kunzler, Webster, NY (US); Robert Stupplebeen, Webster, NY (US)

(73) Assignee: DENTSPLY SIRONA Inc., York, PA (US)

( * ) Notice: Subject to any disclaimer, the term of this patent is extended or adjusted under 35 U.S.C. 154(b) by 512 days.

(21) Appl. No.: 16/277,342

(22) Filed: Feb. 15, 2019

(65) Prior Publication Data

US 2020/0261192 A1   Aug. 20, 2020

(51) Int. Cl.
  *A61C 13/01* (2006.01)
  *A61C 13/093* (2006.01)

(52) U.S. Cl.
  CPC .......... *A61C 13/01* (2013.01); *A61C 13/1006* (2013.01)

(58) Field of Classification Search
  CPC ... A61C 13/01; A61C 13/1006; A61C 13/081; A61C 13/1003
  See application file for complete search history.

(56) References Cited

U.S. PATENT DOCUMENTS

| | | | |
|---|---|---|---|
| 1,518,075 A * | 12/1924 | Kesling | A61C 11/022 433/72 |
| 2,179,502 A | 11/1939 | Erdle | |
| 2,932,893 A | 4/1960 | Marder | |
| 3,327,392 A * | 6/1967 | Crow | A61C 13/00 433/192 |
| 3,367,027 A | 2/1968 | Kato | |

(Continued)

FOREIGN PATENT DOCUMENTS

| JP | 3155831 U | 11/2009 |
|---|---|---|
| WO | 2018036853 A1 | 3/2018 |

OTHER PUBLICATIONS

International Search Report; PCT/US2020/018062; May 26, 2020 (completed); Jun. 4, 2020 (dated).

(Continued)

*Primary Examiner* — Nicholas D Lucchesi
*Assistant Examiner* — Hao D Mai
(74) *Attorney, Agent, or Firm* — Dentsply Sirona Inc.

(57) ABSTRACT

The invention relates to a denture base having a plurality of tooth socket compartments where one or more of the tooth socket compartments comprises a convex surface configured in step-like structure, and one or more prominences on the step-like structure. The invention further relates to a dental prosthesis including the denture base, at least one bonding agent, and a plurality of artificial teeth. Artificial teeth are bonded within tooth socket compartments such that each artificial tooth can rest upon the top of each prominence in the tooth socket compartment, maintaining a predetermined amount of bonding agent between the artificial tooth and the denture base. The denture base and dental prosthesis of the invention can better address the need for easier, more efficient and reliable set-up of artificial teeth in a denture base, and ensuring more consistent and predictable bonding of artificial teeth in a denture base.

20 Claims, 4 Drawing Sheets

(56) References Cited

U.S. PATENT DOCUMENTS

| | | | | |
|---|---|---|---|---|
| 3,407,500 | A * | 10/1968 | Kesling | A61C 7/08 433/6 |
| 3,644,996 | A * | 2/1972 | Weinkle | A61C 13/1013 433/171 |
| 3,987,546 | A * | 10/1976 | Trampe | A61C 13/225 433/213 |
| 4,161,065 | A * | 7/1979 | Gigante | A61C 13/1013 264/18 |
| 4,457,713 | A * | 7/1984 | Schneider | A61C 13/0001 264/18 |
| 4,470,815 | A * | 9/1984 | Hazar | A61C 13/00 264/18 |
| 5,197,874 | A * | 3/1993 | Silva | A61C 9/002 433/34 |
| 5,501,598 | A | 3/1996 | Misch | |
| 5,788,490 | A * | 8/1998 | Huffman | A61C 9/002 433/213 |
| 6,139,321 | A * | 10/2000 | MacCulloch | A61C 13/1016 433/171 |
| 6,719,562 | B1 * | 4/2004 | Oestreich | G09B 23/283 433/213 |
| 10,206,767 | B2 * | 2/2019 | Boehm | A61C 13/0001 |
| 10,799,320 | B2 * | 10/2020 | Ertugrul | A61C 1/12 |
| 2004/0219490 | A1 * | 11/2004 | Gartner | A61C 13/0004 433/218 |
| 2006/0281051 | A1 * | 12/2006 | Koller | A61C 13/1006 433/198 |
| 2007/0212663 | A1 * | 9/2007 | Oestreich | G09B 23/283 433/213 |
| 2011/0129796 | A1 * | 6/2011 | Riggio | A61C 19/04 433/171 |
| 2011/0236849 | A1 * | 9/2011 | Pogorelsky | A61C 13/10 433/24 |
| 2011/0236856 | A1 * | 9/2011 | Kanazawa | A61C 13/1003 433/199.1 |
| 2012/0237903 | A1 * | 9/2012 | Klare | A61C 9/002 433/213 |
| 2013/0041630 | A1 * | 2/2013 | Gilles | A61C 13/34 703/1 |
| 2013/0108988 | A1 * | 5/2013 | Simoncic | A61C 13/0004 433/192 |
| 2013/0171588 | A1 * | 7/2013 | Shima | A61C 13/01 433/192 |
| 2013/0216980 | A1 * | 8/2013 | Boronkay | A61C 13/34 433/213 |
| 2016/0193019 | A1 * | 7/2016 | Heinz | A61C 13/1006 433/37 |
| 2017/0007381 | A1 * | 1/2017 | Minakuchi | A61C 13/08 |
| 2017/0135790 | A1 * | 5/2017 | Boehm | A61C 13/01 |
| 2018/0280120 | A1 * | 10/2018 | Berger | A61C 13/225 |
| 2019/0388198 | A1 * | 12/2019 | Okumura | A61C 13/0004 |

OTHER PUBLICATIONS

Written Opinion of the International Searching Authority; PCT/US2020/018062; May 26, 2020 (completed); Jun. 4, 2020 (dated).

* cited by examiner

DENTURE BASE AND DENTAL PROSTHESIS

BACKGROUND OF THE INVENTION

In the field of prosthodontics, the set-up of teeth within a denture base is not a trivial task. It requires a skilled technician with an in-depth knowledge of the entire denture fabrication process, tooth design (widths and lengths), occlusal angles, and overall tooth placement schemes. Even for the skilled technician, precise placement and fitting of artificial teeth in a denture base often requires repeated interventions. For example, small dimensional variances or imperfections formed in the basal surface area of pre-fabricated teeth, as well as inner surfaces of tooth sockets for the receiving denture base, may contribute to instability (e.g., rocking, or rotation) or misalignment (e.g., tilting, or imbalance) of tooth placement in the denture base. Significant time and effort may be expended in a careful process of adjusting and correcting for dimensional deviations or incompatibilities present (either in the artificial teeth or the denture base) to achieve both proper function and aesthetics of the dental prosthesis for the patient. Therefore, accurate teeth set-up remains a more difficult, and thus more time-consuming and expensive process, than desired.

One of the key benefits of cast molded teeth are their aesthetics. In many cases, exterior shades and features of these teeth make them life-like, and thus are difficult to distinguish between natural teeth. The overall cast molding process results in generally good dimensional consistency with a wide variety of designs. Nevertheless, despite efforts to minimize or eliminate formation of unwanted variations on the tooth surface, it is not uncommon for the cast molding process to introduce small surface anomalies or imperfections (e.g., a mold seam line or sprue area bulge or bump) on at least one tooth surface. Typically, to avoid detrimental appearance to the visible tooth surface, manufacturers design tooth molds to isolate such imperfections to the basal or lower portion of molded teeth, where they are seated and attached to a denture base. However, by isolating these surface imperfections to the non-visible basal tooth surface, such surface anomalies or variances are then subject to intimate contact and obtrusive interference with tooth sockets of the denture base, thus being a causative factor in the aforementioned instability and misalignment of tooth placement in the denture base. Consequently, to improve fit or otherwise overcome these issues, a technician will need to apply considerable experience, judgment, and care to painstakingly remove some surface areas of teeth by grinding or filing. They may even need to repeat such efforts across the multiple teeth required to complete a prosthesis for a satisfactory outcome, thus adding more time and cost for completion.

With the advent of recent improvements in CAD/CAM design and fabrication technologies utilizing CNC milling or additive manufacturing (i.e., three-dimensional printing), denture bases and dental prostheses can be produced with favorable accuracy and efficiency in comparison to more traditional cast molding techniques. By designing denture bases and dental prostheses in a digital environment, virtual libraries of various artificial tooth shapes can be applied to form complementary or nearly-exact matching modifications to denture base surfaces for receiving pre-formed artificial teeth. However, the creation of precise matching surfaces between a tooth and denture base can give rise to additional difficulties or deficiencies. Firstly, during insertion and positioning of these surfaces against one another, extensive surface-to-surface friction or sticking due to such a close-fitting arrangement can create an undesirable jamming or "locking together" effect. This can impede a technician from making subtle but important positional changes to optimize tooth orientation and alignment in the denture base. In such cases, a technician may be forced to make small subtractive adjustments (e.g., removing surface areas of artificial tooth and/or denture base) to create more leeway between surfaces. Thus, a well-intended intervention to improve fit can inadvertently produce an unwanted physical imbalance/distortion or visible flaw, necessitating yet further corrective time-consuming action. Secondly, during the process of permanently securing each artificial tooth to the denture base, typically one or more setting/curing adhesives or bonding agents are placed between the basal surface of the artificial tooth and the tooth socket of the denture base to fix them together. When mating areas of the basal surface of the artificial tooth and the tooth socket of the denture base are made to precisely match and contact one another across the entirety of their surfaces, integrity of the bonding process and bond quality can be compromised. That is to say, bond quality can be more variable (less consistent), both across different teeth within the same denture, as well as across different dentures. More particularly, bond quality can be more strongly influenced by such factors as the quantity and viscosity of bonding agent(s) delivered, and the amount of pressure applied by a technician when mating the tooth and denture base together (i.e., creating a more inconsistent and unpredictable bonding layer interface).

For the foregoing reasons, there is a need for a denture base and dental prosthesis that can provide an easier, more efficient and reliable set-up of artificial teeth, as well as a more consistent bonding of artificial teeth, that is less labor-intensive to produce, particularly for milled and additively manufactured denture bases.

SUMMARY

The present invention is directed to a denture base and dental prosthesis that satisfies these and other needs. A denture base having features of the present invention comprises a dental arch form and a plurality of tooth socket compartments recessed within the dental arch form. One or more of these tooth socket compartments comprises a convex surface, where the convex surface is configured in a step-like structure characterized by a tread-like lingual-basal surface and a riser-like buccal-basal surface. The step-like structure may project or extend outward from a lingual-facing side of the tooth socket compartment toward a buccal-facing side of the tooth socket compartment, and substantially traverse the width of the tooth socket compartment in a mesial-distal orientation. One or more prominences may be disposed in at least one of the following manners on the step-like structure:

a) one or more prominences projecting from the lingual-basal surface of the step-like structure;

b) one or more prominences projecting from the buccal-basal surface of the step-like structure;

c) at least one prominence projecting from the lingual-basal surface of the step-like structure, and at least one prominence projecting from the buccal-basal surface of the step-like structure; and d) one or more prominences projecting in a continuous form from both the lingual-basal surface of the step-like structure and the buccal-basal surface of the step-like structure.

In one embodiment of the invention, the lingual-basal surface of the denture base may be substantially flat across the span of its area, exclusive of the prominences projecting from the lingual-basal surface.

In another embodiment of the invention, the buccal-basal surface of the denture base may be substantially convex across its width and substantially flat along its rise height, exclusive of the prominences projecting from the buccal-basal surface.

In still another embodiment of the invention, the buccal-basal surface of the denture base may be substantially convex across its width and substantially convex along its rise height, exclusive of the prominences projecting from the buccal-basal surface.

In a further embodiment of the invention, the prominences may be at least about 25 microns in height, and no more than about 500 microns in height.

In still another embodiment of the invention, the prominences may be at least about 25 microns in width at their widest dimension, and no more than about 10 millimeters in width at their widest dimension.

In yet another embodiment of the invention, at least two prominences may project from the lingual-basal surface of the denture base. Similarly, in another embodiment of the invention, at least two prominences may project from the buccal-basal surface of the denture base.

In embodiments where at least two prominences project from the lingual-basal surface of the denture base, each of the prominences on the lingual-basal surface may be essentially equivalent in height to one another. Similarly, in embodiments where at least two prominences project from the buccal-basal surface of the denture base, each of the prominences on the buccal-basal surface may be essentially equivalent in height to one another.

In other embodiments where at least two prominences project from the lingual-basal surface of the denture base, the prominences on the lingual-basal surface may be located in substantially equidistant positions from a bisecting plane of the tooth socket compartment, where the bisecting plane of the tooth socket compartment is essentially orthogonal to the mesial-distal orientation of the tooth socket compartment. Similarly, in embodiments where at least two prominences project from the buccal-basal surface of the denture base, the prominences on the buccal-basal surface may be located in substantially equidistant positions from a bisecting plane of the tooth socket compartment, where the bisecting plane of the tooth socket compartment is essentially orthogonal to the mesial-distal orientation of the tooth socket compartment.

In still other embodiments where at least two prominences project from the lingual-basal surface and/or the buccal-basal surface of the denture base, the prominences may be separated by a distance of at least about 25 microns and no more than about 8 millimeters, as measured from the perimeter at the base of the prominence.

A dental prosthesis may comprise a denture base embodying one or more features of the present invention. The dental prosthesis may further comprise at least one bonding agent, and a plurality of artificial teeth bonded to the denture base. The size and shape of the basal surface of each artificial tooth is adapted to be received in at least one of the tooth socket compartments of the denture base of the present invention. Each artificial tooth is bonded within the tooth socket compartment by the at least one bonding agent, whereby the basal surface of each artificial tooth rests upon the top of prominences within the tooth socket compartment, such that a predetermined amount of bonding agent(s) is maintained between the artificial tooth and the denture base.

BRIEF DESCRIPTION OF THE DRAWINGS

These and other features, aspects, exemplary embodiments, and advantages of the present invention will become better understood with regard to the following description, appended claims, and accompanying drawings where:

DETAILED DESCRIPTION

Figure 1:
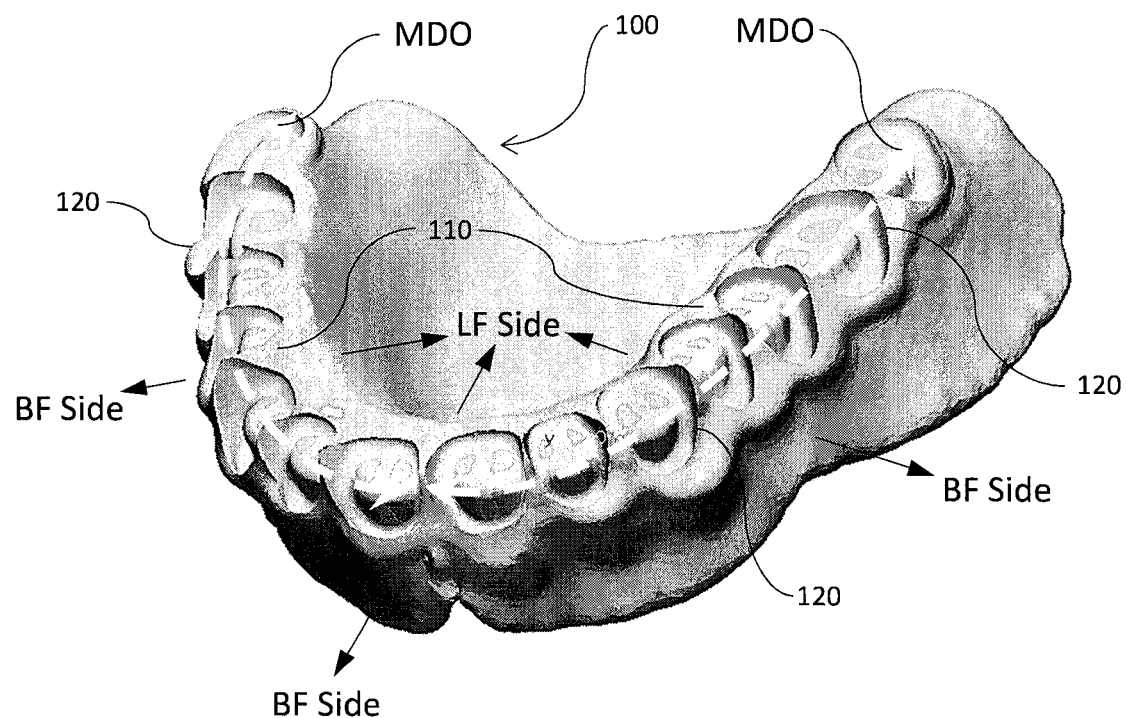
FIG. 1 shows a perspective view of a digital image for an upper (maxillary) full denture base embodying some aspects of the present invention.

In the Summary above, and in the Detailed Description and Claims presented below, along with the accompanying drawings, reference is made to particular features and embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The following additional definitions shall apply throughout the specification and claims of the invention, unless specifically indicated otherwise.

The term "about" is used herein as a term of approximation to mean plus or minus 5 percent of the specified value, preferably plus or minus 3 percent of the specified value, more preferably plus or minus 1 percent of the specified value.

The terms "essentially" and "substantially" are used herein as terms of approximation to denote in large part, but not necessarily wholly or perfectly, in relation to the fundamental nature or predominant characteristic being described.

The term "at least" followed by a number is used herein to denote the start of a range beginning with that number (which may be a range having an upper limit or no upper limit, depending on the variable being defined). For example, "at least 1" means 1 or more than 1.

The terms "at most" or "no more than" followed by a number is used herein to denote the end of a range ending with that number (which may be a range having 1 or 0 as its lower limit, or a range having no lower limit, depending upon the variable being defined). For example, "at most 100" or "no more than 100" means 100 or less than 100. When, in this specification, a range is given as "(a first number) to (a second number)" or "(a first number)-(a second number)," this means a range whose lower limit is the first number and whose upper limit is the second number. For example, 1 to 5 mm means a range whose lower limit is 1 mm, and whose upper limit is 5 mm.

The term "and/or," as used herein, includes any and all possible combinations of one or more of the associated listed items, as well as the lack of combination when interpreted in the alternative ("or"). For example, "A and/or B" means A alone, B alone, or A and B together or mixtures thereof. Directional or spatially relative terms, such as "under," "below," "beneath," "lower," "over," "upper," "above," "on top" and the like, may be used herein for ease of description to describe the relationship of an element or feature to other element(s) or feature(s) illustrated in the figures. It will be understood that the spatially relative terms are intended to encompass different orientations of the device in addition to the orientations depicted in the figures. For example, if the device in the figures were to be inverted, elements or features described as "above" or "on top" other elements or features would then be oriented "below" or "under" the other elements or features. The device may be otherwise oriented (e.g., rotated at 90 degrees or other orientations) and the spatially relative descriptors used herein interpreted accordingly. Similarly, the terms "upward," "downward," "vertical," "horizontal" and the like are used herein for the purpose of relative explanation only, unless specifically indicated otherwise.

The term "dental arch form" is used herein to mean the three-dimensional curved configuration or shape of a dental arch, either an upper (maxillary) arch or lower (mandibular) arch, that resembles the contour where the alveolar crest and dentition reside. It should also be understood that a "dental arch form" is not meant to be limited to full denture bases and prostheses only, but also applies to partial denture bases and prostheses.

The term "step-like" is used herein to mean a configuration or shape that resembles or looks like the outline of a step form.

The term "tread-like" is used herein to mean a substantially horizontal top section or surface of a "step-like" structure that resembles or looks like the horizontal tread portion of steps or stairs.

The term "riser-like" is used herein to mean a substantially vertical, upright section or surface of a "step-like" structure that resembles or looks like the vertical riser portion in between separate tread surfaces of steps or stairs.

The term "lingual-facing side" is used herein to mean in the direction or space facing next to or toward the tongue of the oral cavity.

The term "buccal-facing side" is used herein to mean the direction or space facing next to or toward the cheek and/or lips of the oral cavity.

The term "basal" is used herein to denote a location relating to the foundation, or situated at, forming, or belonging to a base or bottom area of an element or feature.

The term "lingual-basal" is used herein to denote the substantially horizontal portion or section within a tooth socket compartment that is adjacent or proximate to the lingual-facing side of a denture base.

The term "buccal-basal" is used herein to denote the substantially vertical, upright portion or section within a tooth socket compartment that is adjacent or proximate to the buccal-facing side of a denture base.

The term "mesial-distal orientation" is used herein to mean the direction of curvature of the dental arch from the centerline of the dental arch, or median sagittal plane of the face, to the distal or remote end of the dental arch.

As shown in FIG. 1 for an upper (or maxillary) full denture base, a denture base (100) comprises a dental arch form (110) and a plurality of tooth socket compartments (120) recessed within the dental arch form. The dental arch form may be further regarded as having a lingual-facing side ("LF Side" as shown in FIG. 1) and a buccal-facing side ("BF Side" as shown in FIG. 1). As shown in FIG. 1, the tooth socket compartments may be advantageously arranged in adjacent or neighboring positions about the dental arch form along a mesial-distal orientation (line MDO as shown in FIG. 1). To ensure a more natural-looking dental prosthesis, it is also advantageous that each of the tooth socket compartments be configured for receiving a suitable artificial tooth form. Without intending to be limiting, a suitable artificial tooth form is one where the outer contour, or shape profile, and size corresponds to an appropriate artificial tooth type (i.e., incisor, cuspid/canine, bicuspid/premolar, molar) and/or tooth number (such as used in the FDI World Dental Federation notation system) in relation to the native oral anatomy and location or position along a dental arch. And while FIG. 1 is a representative example of a version of the invention, it should also be understood that the invention is not intended to be limited to only upper (maxillary) full denture bases. Embodiments of the invention may also be applied to upper partial denture bases, lower (mandibular) full denture bases, and lower partial denture bases.

Figure 2:
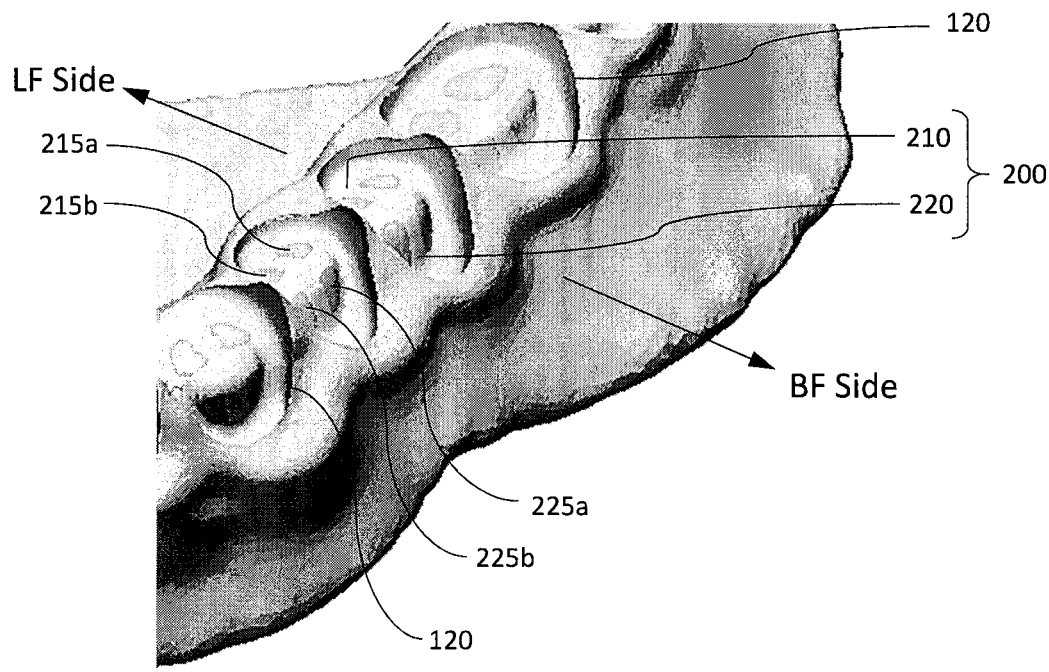
FIG. 2 shows an isolated close-up perspective view of a digital image for a section of the denture base of FIG. 1.

As shown in FIG. 2, at least one of these tooth socket compartments, and preferably a plurality of tooth socket compartments, may be defined by a convex surface, where the convex surface is configured in a step-like structure (200) characterized by a tread-like (substantially horizontal portion) lingual-basal surface (210), and a riser-like (substantially vertical portion) buccal-basal surface (220). The step-like structure projects or extends outward from a lingual-facing side ("LF Side") of the tooth socket compartment toward a buccal-facing side ("BF Side") of the tooth socket compartment, and substantially traverses the width of the tooth socket compartment in a mesial-distal orientation.

Figure 3:
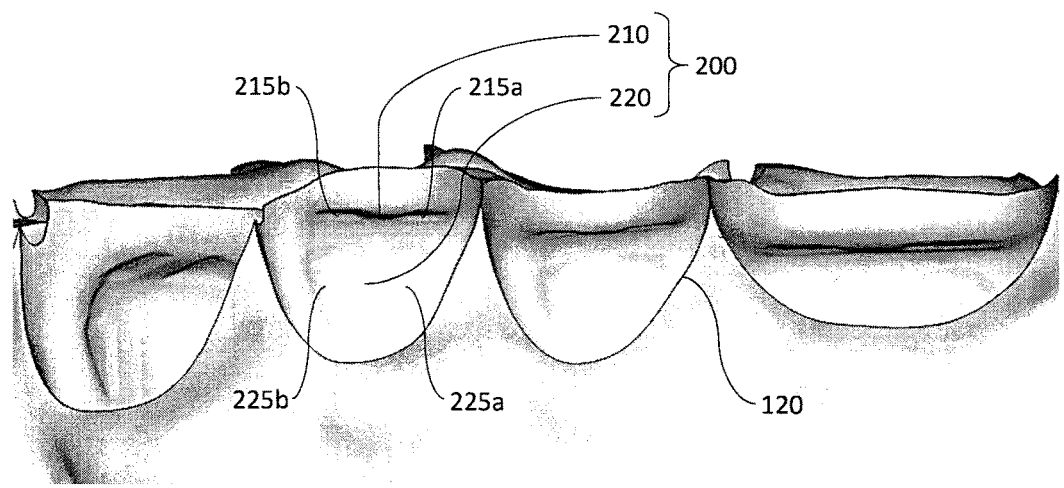
FIG. 3 shows an isolated close-up side view of a digital image for tooth socket compartments and prominences on a step-like structure within a section of a dental arch form.

In FIG. 2, prominences (215a, 215b) are shown projecting or extending outward from the tread-like lingual-basal surface (210). Prominences are surface structures or surface features that project or extend outward from the surface of the step-like structure (200) within the tooth socket compartment. Additional prominences (225a, 225b) are shown projecting or extending outward from the riser-like buccal-basal surface (220). FIG. 3 shows a close-up side view representation of tooth socket compartments in a dental arch form. Here again, prominences (215a, 215b) are shown projecting or extending outward from the tread-like lingual-basal surface (210), and prominences (225a, 225b) are shown projecting or extending outward from the riser-like buccal-basal surface (220).

Step-Like Structure

Figure 4A:
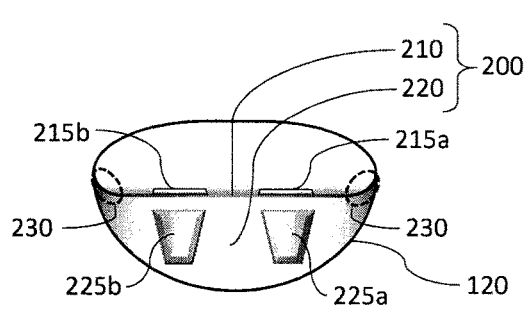
FIG. 4A shows a side view representation of a single tooth socket compartment with an embodiment of transition surface area, where a substantially flat lingual-basal surface meets with the perimeter of the tooth socket compartment.
Figure 4B:
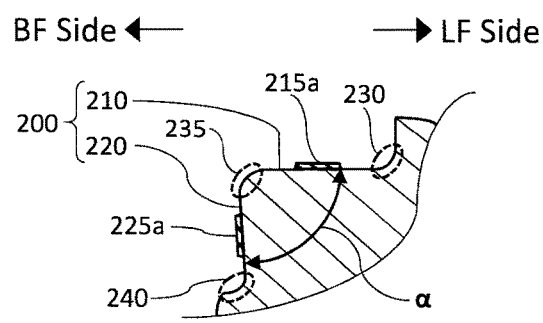
FIG. 4B shows a cross-sectional view (i.e., orthogonal to the mesial-distal orientation or direction of curvature of the dental arch form) representative of a step-like structure and prominences within a tooth socket compartment.

In an embodiment of the invention, the step-like structure of a tooth socket compartment may have a tread-like lingual-basal surface that is substantially flat across the span of its area within the tooth socket compartment, exclusive of the prominences projecting from the lingual-basal surface. Here, "substantially flat" means that the area is generally or mainly, though not necessarily entirely or perfectly, flat. For example, in versions of the invention as shown in FIGS. 4A and 4B, there may be a generally or mainly flat surface area extending throughout the central portion of the tread-like lingual-basal surface (210), transitioning to an arcuate or bent surface area (230) where the lingual-basal surface meets with the perimeter of the tooth socket compartment (120). Additionally or alternatively, in another version of the invention as shown in FIG. 4B, there may be a generally or mainly flat surface area extending throughout the central portion of the tread-like lingual-basal surface, transitioning to an arcuate or bent surface area (235) where the outwardly extending distal free edge of the lingual-basal surface (210) meets with the outwardly extending distal free edge of the buccal-basal surface (220) of the tooth socket compartment.

Figure 4C:
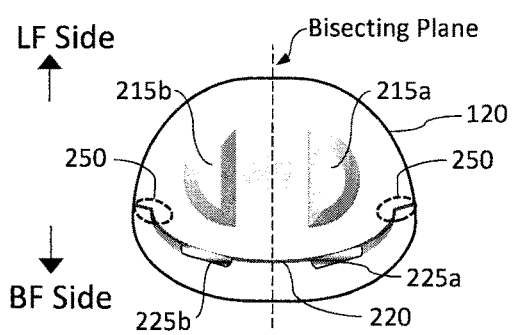
FIGS. 4C and 4D show top view representations (i.e., viewing down onto the dental arch form oriented with tooth socket compartments in an upward facing direction) of a single tooth socket compartment with different embodiments of transition surface area, where a convex buccal-basal surface meets with the perimeter of the tooth socket compartment.
Figure 4D:
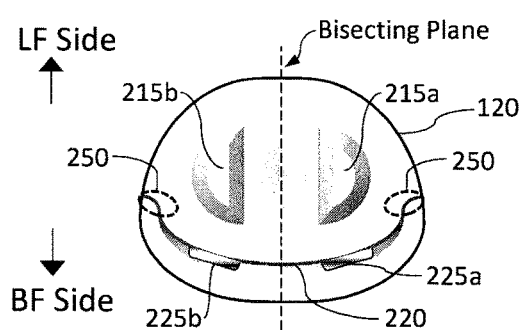

In another embodiment of the invention, the step-like structure of a tooth socket compartment may have a riser-like buccal-basal surface that is substantially convex across its width and substantially flat across its rise height, exclusive of the prominences projecting from the buccal-basal surface. Here, "substantially convex" means that the area is generally or mainly, though not necessarily entirely or perfectly, convex. For example, in one version of the invention as shown in FIG. 4C, there may be a generally or mainly convex surface area extending throughout the central portion of the riser-like buccal-basal surface (220) across its width, transitioning to a flat surface area (250) where the buccal-basal surface meets with the perimeter of the tooth socket compartment (120). Alternatively, as shown in FIG. 4D, there may be a generally or mainly convex surface area extending throughout the central portion of the riser-like buccal-basal surface (220) across its width, transitioning to an arcuate or bent surface area (250) where the buccal-basal surface meets with the perimeter of the tooth socket compartment (120). In an alternative embodiment of the invention, the step-like structure of a tooth socket compartment may have a riser-like buccal-basal surface that is both substantially convex across its width and substantially convex across its rise height, exclusive of the prominences projecting from the buccal-basal surface.

In an embodiment of the invention, the angle (a), as shown in FIG. 4B, formed between the tread-like lingual-basal surface and the riser-like buccal-basal surface may be at least about 80 degrees, and no more than about 110 degrees. In a more preferred embodiment, the angle formed between the tread-like lingual-basal surface and the riser-like buccal basal surface may be at least about 85 degrees, and no more than about 100 degrees.

Prominences

In an embodiment of the invention, one or more prominences may project or extend outward from the lingual-basal surface alone.

In another embodiment of the invention, one or more prominences may project or extend outward from the buccal-basal surface alone.

In a preferred embodiment of the invention, one or more prominences may project or extend outward from the lingual-basal surface, and one or more prominences may project or extend outward from the buccal-basal surface.

In still another preferred embodiment, one or more prominences may project or extend outward in a continuous or uninterrupted form from both the lingual-basal surface and the buccal-basal surface.

In one embodiment, prominences may be formed (e.g., by cast molding, subtractive manufacturing (CNC milling), or additive manufacturing (3D printing) processes) as an integral, coherent structure emanating from the surface of the step-like structure. Here, prominences may be comprised of the same material or composition as the surrounding tooth socket compartment and dental arch form of the denture base. In another embodiment, prominences may be formed by way of a separate or independent process (such as by overmolding or 3D printing) to be adjoined, and securely fastened or bonded to the surface of the step-like structure. Here, prominences may be comprised of at least one material or composition that is different than the surrounding tooth socket compartment and dental arch form of the denture base. The at least one different material or composition may be selected, for example, based on physical properties so as to be less hard or rigid (i.e., more flexible, compressible, or elastic) relative to the material or composition of the surrounding tooth socket compartment and dental arch form. Such materials or compositions may have a durometer hardness ranging from a value of about 10 on the Shore OO durometer scale up to a value of about 100 on the Shore D durometer scale.

The prominences may be formed in a variety of shapes without limitation. FIG. 5 shows some representative versions for the cross-sectional profile shape or contour of a prominence. These are representative versions intended to show some, but not all, of the possible contour embodiments of the invention. In one embodiment, the top of a prominence may take the form of a point or linear location (as exemplified in FIG. 5A to 5B). In an alternative embodiment, the top of a prominence may take the form of a rounded or curved surface (as exemplified in FIG. 5C to 5E). In a preferred alternative embodiment, the top of a prominence may take the form of a substantially flat, planar surface (as exemplified in FIG. 5F to 5H). In such embodiments where the top of the prominence takes the form of a substantially flat, planar surface, the planar surface area itself may be of any shape. Without intending to be limiting, such a shape may be round, ovoid, semi-circular, crescent-shaped, triangular, square, rectangular, rhomboid, symmetrically-shaped, or asymmetrically-shaped (i.e., irregular shape).

Figure 5A:
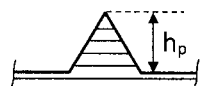
FIG. 5A to 5H show some representative versions for the cross-sectional profile shape or contour of a prominence.
Figure 5B:
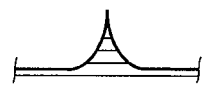
Figure 5C:
Figure 5D:
Figure 5E:
Figure 5F:
Figure 5G:
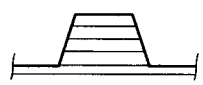
Figure 5H:
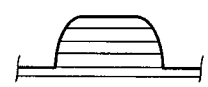
Figure 6A:
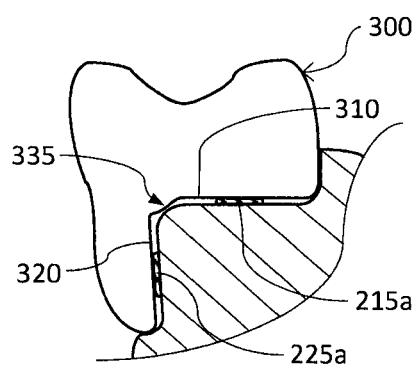
FIG. 6A shows a cross-sectional view representative of an artificial tooth with its basal surface resting or sitting upon uniform (e.g., similar) prominences of essentially equivalent or matching height on the lingual-basal and buccal-basal surfaces of the step-like structure within a tooth socket compartment.

The height of a prominence ($h_p$), for example as shown in FIG. 5A, is the distance between its apex (e.g., top/outer surface that can be in contact with an artificial tooth) and its bottom base or point of origin extending outward from the surface (210, 220) of the step-like structure. The height of prominences may be selected in the design and fabrication of a denture base in such a way as to ensure an effective predetermined clearance spacing or separating gap can be established between the step-like structure of the tooth socket compartment and the basal surface of an artificial tooth resting or sitting upon the prominences. An effective clearance spacing allows for retaining or containing a predictable, predetermined quantity of bonding agent(s) in the interstitial space between an artificial tooth and a tooth socket compartment. An effective clearance spacing also can be established to circumvent or avoid any dimensional imperfections/variability in the basal surface of an artificial tooth. For example, as shown in the cross-sectional views of FIGS. 6A and 6B, the height of prominences (215*a*, 225*a*) on the step-like structure in the tooth socket compartment establishes an effective clearance spacing to circumvent a bulging portion or dimensional imperfection (335) in the basal surface of an artificial tooth (300) that is resting or sitting upon the prominences. In a preferred embodiment, the height of prominences may be at least about 25 microns, and no more than about 500 microns. In a more preferred embodiment, the height of prominences may be at least about 40 microns, and no more than about 300 microns. In an even more preferred embodiment, the height of prominences may be at least about 50 microns, and no more than about 250 microns.

In another preferred embodiment, the width of prominences may be at least about 25 microns, and no more than about 10 millimeters, at their widest dimension. In a more preferred embodiment, the width of prominences may be at least about 40 microns, and no more than about 8 millimeters, at their widest dimension. In an even more preferred embodiment, the width of prominences may be at least about 50 microns, and no more than about 7 millimeters.

In another preferred embodiment of the invention, at least two prominences may project or extend outward from the lingual-basal surface, and at least two prominences may project or extend outward from the buccal-basal surface. In embodiments where at least two prominences are projecting from both the lingual-basal surface and the buccal-basal surface, each of the prominences on the lingual-basal surface may be essentially equivalent in height to one another, and each of the prominences on the buccal-basal surface may be essentially equivalent in height to one another.

In a preferred embodiment, the one or more prominences may be substantially centered (though not required) about a bisecting plane of the tooth socket compartment, in which the bisecting plane of the tooth socket compartment is essentially orthogonal to the mesial-distal orientation of the tooth socket compartment. In a further preferred embodiment, where at least two prominences are present on a lingual-basal surface, the prominences may be located in substantially equidistant positions from a bisecting plane of the tooth socket compartment (for example, as shown by prominences 215*a* and 215*b* in FIGS. 4C and 4D). Similarly, where at least two prominences are present on a buccal-basal surface, the prominences may be located in substantially equidistant positions (though not required) from a bisecting plane of the tooth socket compartment (for example, as shown by prominences 225*a* and 225*b* in FIGS. 4C and 4D). In embodiments where at least two prominences are present on a surface, they may be separated by a distance of at least about 25 microns and no more than about 8 millimeters as measured from the perimeter at the base of the prominence. In a more preferred embodiment, where at least two prominences are present on surface, they may be separated by a distance of at least about 50 microns and no more than about 7 millimeters as measured from the perimeter at the base of the prominence. In an even more preferred embodiment, where at least two prominences are present on surface, they may be separated by a distance of at least about 100 microns and no more than about 6 millimeters as measured from the perimeter at the base of the prominence.

In a preferred embodiment, prominences may occupy from at least about 1% to no more than about 80% of the surface area on the lingual-basal surface and/or buccal-basal surface. In a more preferred embodiment, prominences may occupy from at least about 5% to no more than about 70% of the surface area on the lingual-basal surface and/or buccal-basal surface. In an even more preferred embodiment, prominences may occupy from at least about 10% to no more than about 50% of the surface area on the lingual-basal surface and/or buccal-basal surface.

Figure 6B:
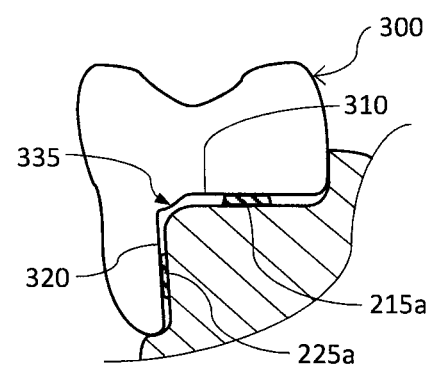
FIG. 6B shows a cross-sectional view representative of an artificial tooth with its basal surface resting or sitting upon non-uniform (e.g., uneven) prominences of unequal or non-matching height on the lingual-basal and buccal-basal surfaces of the step-like structure within a tooth socket compartment.

The one or more prominences on the lingual-basal surface may be established in such a way as to essentially match or duplicate the same characteristic features (e.g., shape, height, width, spacing) of those established on the buccal-basal surface. Alternatively, the one or more prominences on the lingual-basal surface may be established in such a way as to substantially differ from the characteristic features of those established on the buccal-basal surface. This may be advantageous to better satisfy patient-specific design needs of tooth position or alignment, provide greater efficiency or accuracy in manufacture of a denture base, or provide a more favorable distribution or allocation of space for bonding agent(s) to occupy between an artificial tooth and a denture base of a dental prosthesis for improved bond strength. For example, as shown in FIG. 6B, the height of a prominence (215*a*) on the lingual-basal surface of the tooth socket compartment is represented to be greater than the height of a prominence (225*a*) on the buccal-basal surface of the tooth socket compartment.

Denture Base and Dental Prosthesis Fabrication

A dental arch form and tooth socket compartments may be formed in a denture base using any of a number of known methods and materials. The final size and shape of a denture base, including the dental arch form and tooth socket compartments comprised within, is made to patient-specific needs, and may be determined from physical impressions or molds taken of the patient's intra-oral jaw structure (upper and/or lower jaw depending on what is needed), intra-oral imaging, extra-oral imaging, or some combination thereof. A denture base may be formed from a variety of durable materials. Polymeric resin compositions are particularly well-suited to forming denture base materials, and are known to those skilled in the art. For denture bases fabricated using CNC milling processes, a known approach is to use polymeric resin compositions cured in solid form to the shape of circular discs or "pucks." Such discs are provided of sufficient diameter and thickness to accommodate both the height and span of a patient's dental arch to be cut out of the disc by a programmed CNC milling system. For denture bases fabricated using cast molding or additive manufacturing (i.e., three-dimensional printing) processes, uncured or partially cured polymeric resin compositions (e.g., in flowable form, liquid or paste-like) may either be poured or pressed into patient-specific pre-formed denture base molds, or formed layer-by-layer using virtual designs in programmable digitally-controlled light-based curing systems, such as SLA or DLP-based technologies.

Numerous tooth adhesives or bonding agent(s) used to bond artificial teeth to a printed or milled denture base are commercially available. These generally consist of acrylic-based monomers and/or prepolymers that are cured via either redox, heat or visible light polymerization techniques. In a typical case, at least one bonding agent is applied to the tooth socket compartment, applied to the tooth surface, or applied to both just prior to insertion of the tooth, the tooth is inserted into the tooth socket compartment, and then heat and/or light is applied to complete the bonding process. The bonding agent(s) forms a bond between the tooth surface and denture base. In combination with the bonding agent(s), a tooth pretreatment can also be employed where a special bonding agent that includes a combination of solvent and monomer swells the tooth surface. This provides for an additional surface bonding layer and together can improve the overall bond strength. The viscosity, shade and pigmentation of these adhesives or bonding agent(s) may vary, and may be selected or modified as needed to suit the given material selections of denture base and artificial teeth, and/or other patient-specific needs.

Suitable pre-formed artificial teeth forms may be designed, fabricated, and selected so that the size and shape of the basal surface of each artificial tooth is adapted to be received in at least one of the tooth socket compartments of the present invention. Suitable artificial teeth forms are ones where the outer contour, or shape profile, and size corresponds to an appropriate artificial tooth type (i.e., incisor, cuspid/canine, bicuspid/premolar, molar) and/or tooth number (such as used in the FDI World Dental Federation notation system) in relation to the native oral anatomy and location or position along a dental arch. In an embodiment of the invention, each artificial tooth may be bonded within the tooth socket compartment by at least one bonding agent, whereby the basal surface of each artificial tooth rests or sets upon the top of each prominence within the tooth socket compartment (see FIGS. 6A and 6B providing representative cross-sectional views for an artificial tooth setting upon each prominence), such that a predetermined amount of bonding agent(s) is maintained between the artificial tooth and the denture base. Thus, a dental prosthesis may be prepared having a more consistent and predictable bonding layer interface and bonding integrity established between each artificial tooth and the denture base.

The previously described embodiments of the invention provide many distinct advantages, including better addressing the need for easier, more efficient and reliable set-up of artificial teeth in a denture base, in addition to ensuring a more consistent and predictable bonding of artificial teeth in a denture base, making the process of dental prosthesis fabrication more consistent and less labor-intensive.

Establishing a convex step-like structure (200) within a tooth socket compartment was found to be advantageous for several reasons. First, by increasing or enlarging the area of the tooth socket compartment with a convex surface, a larger bonding surface is made available to be covered with bonding agent(s) and support higher bond strength between the denture base and artificial tooth. Further, the convex structure serves to minimize dimensional thinning and loss of denture base material in the recessed tooth socket compartments. Such thinning can be detrimental to denture base warping/distortion, fracture, or tooth breakthrough due to a less robust physical construction. Moreover, the step-like shape provides an efficient structural form that is resistive to both the vertical and horizontal mechanical stresses encountered in use (e.g., forces of shearing/tearing and compression/grinding when biting and chewing). This configuration further ensures stability and durability of tooth position in the tooth socket. Additionally, the step-like shape facilitates establishment of an initial, predetermined macro-scale resting position or setting for a tooth within each tooth socket compartment.

The transitioning surface areas (230, 235, 240, 250), previously described in relation to areas of the lingual-basal and buccal-basal surfaces within the tooth socket compartment, may be advantageous in several ways. Among the advantages, these transition surface areas may provide a more accommodative, less constraining surface profile within the tooth socket compartment with regards to, for example, manufacturing tolerances (either in subtractive processing tool tolerances, or additive manufacturing print resolution). Moreover, these transition surface areas may further facilitate ease of fit against the contour of an artificial tooth, and/or reduce undesirable localized mechanical stress concentrations in tooth socket compartments that can lead to premature weakening or fracture of the denture base.

With the inclusion of prominence structure(s) on the step-like structure within a tooth socket compartment, further advantages can be realized. In one notable aspect, the prominence(s) can provide a supplementary micro-scale setting surface within a tooth socket compartment to further aid a technician with fine-tuning tooth placement and position. Prominence(s) included on the tread-like lingual-basal surface can be established to aid in control of vertical tooth position, independently from any prominence(s) included on the riser-like buccal-basal surface. Likewise, prominences included on the riser-like buccal-basal surface can be established to aid in control of horizontal tooth position, independently from any prominence(s) included on the tread-like lingual-basal surface. Thus, even more precise positioning, orientation, and alignment of an artificial tooth in a tooth socket compartment can be more readily achieved. In a further aspect, the prominence(s) can provide an established controlling structure for ensuring a predetermined clearance spacing, or intermediary gap, between the step-like surface of the tooth socket compartment and the basal surface of a tooth setting or resting upon the prominence(s). By creating this predetermined clearance spacing, the tooth socket compartment can be made more accommodating to a diverse range of pre-formed artificial teeth. Thus, the tooth socket compartment can be adapted to better receive, and equalize or compensate for, a variety of small surface imperfections on the basal surfaces of artificial teeth that would otherwise give rise to tooth instability (e.g., rocking, or pivoting) or misalignment (e.g., tilting, or imbalance). Prominence(s) may be configured as needed to best mitigate or accommodate surface imperfections/variability observed in the basal surfaces of artificial teeth (or perhaps other dimensional limitations observed in manufacturing the tooth socket compartments), thus ensuring an easier, more efficient and reliable tooth set-up process. The number, size/dimension, shape, and spacing of prominence(s) can be suitably chosen and/or modified in advance by a technician in designing a denture base to suit specific needs. For example, having each of the prominences on a surface substantially centered and/or in equidistant positions from a bisecting plane of the tooth socket compartment can be particularly advantageous for ensuring balanced or evenly distributed physical support of an artificial tooth surface within the tooth socket compartment. Also, separating prominences by the preferred distances disclosed above can be particularly advantageous for ensuring efficient flow, distribution, or infilling of bonding agent(s) between or around prominences on the step-like structure. Furthermore, the predetermined clearance spacing can ensure a controlled gap or separation between the basal surface of a tooth and the tooth socket compartment for establishing a more consistent bonding layer interface. Here again, the number, size/dimension, shape, and spacing of prominence(s) can be suitably chosen and/or adjusted in advance by a technician in designing a denture base to suit specific needs. Prominence(s) may be configured as needed for best achieving the desired volume and/or depth/thickness of bonding agent occupying the interstitial space between the tooth surface and tooth socket surface. Thus, a significant amount of technician-dependent variability can be reduced in the bonding process, enabling a more predictable and reliable bond quality to be achieved.

However, it should also be recognized that the present invention does not require that all the preferred or advantageous features, nor all the advantages, need to be incorporated into every embodiment of the invention. Although the present invention has been described in considerable detail with reference to certain preferred versions thereof, other versions are possible within the scope the invention. Therefore, the spirit and scope of the appended claims should not be limited to the description of the preferred versions contained herein. All of the features disclosed in this specification, including any accompanying claims, abstract, and drawings, may be replaced by alternative features serving the same, equivalent, or similar purpose, unless expressly stated otherwise. Thus, unless expressly stated otherwise, each feature disclosed is one example only of a generic series of equivalent or similar features.

What is claimed is:

1. A denture base for a dental prosthesis, comprising:
   a dental arch form;
   a plurality of tooth socket compartments recessed within the dental arch form, wherein a first tooth socket compartment of the plurality of tooth socket compartments comprises a convex surface, the convex surface configured in a step-like structure characterized by a tread-like lingual-basal surface having a substantially horizontal top section or surface and a riser-like buccal-basal surface having a substantially vertical, upright section or surface, such that the step-like structure projects from a lingual-facing side of the first tooth socket compartment toward a buccal-facing side of the first tooth socket compartment, and substantially traverses a width of the first tooth socket compartment in a mesial-distal orientation; and at least one prominence projecting from the lingual-basal surface of the step-like structure of the first tooth socket compartment, and at least one prominence projecting from the buccal-basal surface of the step-like structure of the first tooth socket compartment.

2. The denture base according to claim 1, wherein the lingual-basal surface is substantially flat across a span of its area, exclusive of the at least one prominence projecting from the lingual-basal surface.

3. The denture base according to claim 1, wherein the buccal-basal surface is substantially convex across its width and substantially flat along its rise height, exclusive of the at least one prominence projecting from the buccal-basal surface.

4. The denture base according to claim 1, wherein the buccal-basal surface is substantially convex across its width and substantially convex along its rise height, exclusive of the at least one prominence projecting from the buccal-basal surface.

5. The denture base according to claim 1, wherein the at least one prominence of the lingual-basal and buccal-basal surfaces are at least about 25 microns, and no more than about 500 microns, in height.

6. The denture base according to claim 5, wherein the at least one prominence of the lingual-basal and buccal-basal surfaces are at least about 25 microns, and no more than about 10 millimeters, in width at their widest dimension.

7. The denture base according to claim 6, wherein the at least one prominence comprises: at least two prominences projecting from the lingual-basal surface of the first tooth socket compartment, and at least two prominences projecting from the buccal-basal surface of the first tooth socket compartment.

8. The denture base according to claim 7, wherein each of the at least two prominences on the lingual-basal surface are essentially equivalent in height to one another, and each of the at least two prominences on the buccal-basal surface are essentially equivalent in height to one another.

9. The denture base according to claim 8, wherein the at least two prominences on the lingual-basal surface and the at least two prominences on the buccal-basal surface are located in substantially equidistant positions from a bisecting plane of the first tooth socket compartment, in which the bisecting plane of the first tooth socket compartment is essentially orthogonal to the mesial-distal orientation of the first tooth socket compartment.

10. The denture base according to claim 9, wherein the at least two prominences of the lingual-basal and buccal-basal surfaces are separated by a distance of at least about 25 microns and no more than about 8 millimeters, as measured from the perimeter at the base of each of the at least two prominences of the lingual-basal and buccal-basal surfaces.

11. A dental prosthesis comprising:
    (a) a denture base, which is comprised of:
        a dental arch form;
        a plurality of tooth socket compartments recessed within the dental arch form, wherein each of the plurality of tooth socket compartments comprise a convex surface, the convex surface configured in a step-like structure characterized by a tread-like lingual-basal surface having a substantially horizontal top section or surface and a riser-like buccal-basal surface having a substantially vertical, upright section or surface, such that the step-like structure projects from a lingual-facing side of the plurality of tooth socket compartments toward a buccal-facing side of the plurality of tooth socket compartments, and substantially traverses a width of the plurality of tooth socket compartments in a mesial-distal orientation; wherein at least one prominence projecting from the lingual-basal surface of the step-like structure of the plurality of tooth socket compartments, and at least one prominence projecting from the buccal-basal surface of the step-like structure the plurality of tooth socket compartments;
    (b) at least one bonding agent; and
    (c) a plurality of artificial teeth, wherein a size and shape of a basal surface of each of the plurality of artificial teeth is adapted to be received in at least one of the plurality of tooth socket compartments, and each artificial tooth is bonded within each of the plurality of tooth socket compartments by the at least one bonding agent, whereby the basal surface of each artificial tooth rests upon a top of each of the at least one prominence of the lingual-basal and buccal-basal surfaces within the plurality of tooth socket compartments, such that a predetermined amount of the at least one bonding agent is maintained between the artificial tooth and the denture base.

12. The dental prosthesis according to claim 11, wherein the lingual-basal surface is substantially flat across a span of its area, exclusive of the at least one prominence projecting from the lingual-basal surface.

13. The dental prosthesis according to claim 11, wherein the buccal-basal surface is substantially convex across its width and substantially flat along its rise height, exclusive of the at least one prominence projecting from the buccal-basal surface.

14. The dental prosthesis according to claim 11, wherein the buccal-basal surface is substantially convex across its width and substantially convex along its rise height, exclusive of the at least one prominence projecting from the buccal-basal surface.

15. The dental prosthesis according to claim 11, wherein the at least one prominence of the lingual-basal and buccal-basal surfaces are at least about 25 microns, and no more than about 500 microns, in height.

16. The dental prosthesis according to claim 15, wherein the at least one prominence of the lingual-basal and buccal-basal surfaces are at least about 25 microns, and no more than about 10 millimeters, in width at their widest dimension.

17. The dental prosthesis according to claim 16, wherein the at least one prominence comprises: at least two prominences projecting from the lingual-basal surface of the plurality of tooth socket compartments, and at least two prominences projecting from the buccal-basal surface of the plurality of tooth socket compartments.

18. The dental prosthesis according to claim 17, wherein each of the at least two prominences on the lingual-basal surface are essentially equivalent in height to one another, and each of the at least two prominences on the buccal-basal surface are essentially equivalent in height to one another.

19. The dental prosthesis according to claim 18, wherein the at least two prominences on the lingual-basal surface and the at least two prominences on the buccal-basal surface are located in substantially equidistant positions from a bisecting plane of the plurality of tooth socket compartments, in which the bisecting plane of each of the plurality of tooth socket compartments is essentially orthogonal to the mesial-distal orientation of each of the plurality of tooth socket compartments.

20. The dental prosthesis according to claim 19, wherein the at least two prominences of the lingual-basal and buccal-basal surfaces are separated by a distance of at least about 25 microns and no more than about 8 millimeters, as measured from the perimeter at the base of each of the at least two prominences of the lingual-basal and buccal-basal surfaces.

* * * * *